United States Patent
Xu et al.

(10) Patent No.: US 10,739,635 B2
(45) Date of Patent: Aug. 11, 2020

(54) DISPLAY PANEL AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Xiaoling Xu, Beijing (CN); Yanfeng Wang, Beijing (CN); Yun Qiu, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 104 days.

(21) Appl. No.: 15/745,026

(22) PCT Filed: Jul. 11, 2017

(86) PCT No.: PCT/CN2017/092469
§ 371 (c)(1),
(2) Date: Jan. 15, 2018

(87) PCT Pub. No.: WO2018/107736
PCT Pub. Date: Jun. 21, 2018

(65) Prior Publication Data
US 2019/0011768 A1     Jan. 10, 2019

(30) Foreign Application Priority Data
Dec. 13, 2016 (CN) .......................... 2016 1 1149664

(51) Int. Cl.
*G02F 1/1335* (2006.01)
*G02F 1/1343* (2006.01)
(Continued)

(52) U.S. Cl.
CPC ...... *G02F 1/133526* (2013.01); *G02F 1/1313* (2013.01); *G02F 1/134309* (2013.01);
(Continued)

(58) Field of Classification Search
None
See application file for complete search history.

(56) References Cited

U.S. PATENT DOCUMENTS

2015/0372187 A1   12/2015  Bower et al.
2017/0062683 A1*   3/2017  Chen .................. H01L 33/145
(Continued)

FOREIGN PATENT DOCUMENTS

CN   101852923 A   10/2010
CN   102854693 A    1/2013
(Continued)

OTHER PUBLICATIONS

First Office Action dated Mar. 5, 2018 corresponding to Chinese application No. 201611149664.X.
(Continued)

*Primary Examiner* — Phu Vu
(74) *Attorney, Agent, or Firm* — Nath, Goldberg & Meyer; Joshua B. Goldberg

(57) ABSTRACT

The present disclosure provides a display panel and a display device. The display panel includes a display substrate and a liquid crystal lens provided at a light exiting surface side of the display substrate. The display substrate includes a first base body and a plurality of pixel units provided on the first base body, and each of the plurality of pixel units includes an inorganic light-emitting diode. The liquid crystal lens includes a plurality of lens units which are arranged to have a one-to-one correspondence to the plurality of pixel units, and configured to adjust directions of light emitted from the inorganic light-emitting diodes of the plurality of pixel units, respectively.

16 Claims, 1 Drawing Sheet

(51) Int. Cl.
G09G 3/36 (2006.01)
G02F 1/13 (2006.01)
G02F 1/29 (2006.01)

(52) U.S. Cl.
CPC ............. G02F 1/29 (2013.01); G09G 3/3611 (2013.01); *G02F 2001/294* (2013.01)

(56) References Cited

U.S. PATENT DOCUMENTS

| 2018/0219142 A1* | 8/2018 | Chen | H01L 33/007 |
| 2019/0098288 A1* | 3/2019 | Yu | H04N 13/302 |

FOREIGN PATENT DOCUMENTS

| CN | 105446028 A | 3/2016 |
| CN | 105866865 A | 8/2016 |
| CN | 106652815 A | 5/2017 |
| CN | 206249825 U | 6/2017 |
| WO | 2014061400 A1 | 4/2014 |

OTHER PUBLICATIONS

International Search Report dated Oct. 11, 2017 corresponding to application No. PCT/CN2017/092469.

* cited by examiner

DISPLAY PANEL AND DISPLAY DEVICE

CROSS-REFERENCE TO RELATED APPLICATIONS

This is a National Phase Application filed under 35 U.S.C. 371 as a national stage of PCT/CN2017/092469, filed on Jul. 11, 2017, an application claiming the priority of Chinese Patent Application No. 201611149664.X, filed on Dec. 13, 2016, the contents of which are incorporated herein in their entirety by reference.

TECHNICAL FIELD

The present disclosure relates to the field of display technology, and in particular, relates to a display panel and a display device.

BACKGROUND

With the development of flat panel display technology, users have increasingly high requirements for performances of a display panel, and the display panel is required to have features such as high resolution, flexibility, transparency, high brightness, high contrast, light weight, low power consumption, high color gamut, and the like.

SUMMARY

The present disclosure provides a multi-view display panel and a multi-view display device.

Some embodiments of the present disclosure provide a display panel including a display substrate and a liquid crystal lens provided at a light exiting surface side of the display substrate, wherein the display substrate includes a first base body and a plurality of pixel units provided on the first base body, and each of the plurality of pixel units includes an inorganic light-emitting diode; and the liquid crystal lens includes a plurality of lens units, the plurality of lens units are arranged to have a one-to-one correspondence to the plurality of pixel units, and configured to adjust directions of light emitted from the inorganic light-emitting diodes of the plurality of pixel units, respectively.

In an embodiment, the display panel further includes a planarization layer provided between the display substrate and the liquid crystal lens, wherein each of the plurality of lens units includes a first electrode provided at a side of the planarization layer distal to the display substrate, a second base body provided opposite to the first electrode, a second electrode provided at a side of the second base body proximal to the first electrode, and a liquid crystal layer provided between the first electrode and the second electrode.

In an embodiment, the first electrode is a plate-shaped electrode, and the second electrode is a ring-shaped electrode.

In an embodiment, the first electrode is a plate-shaped electrode, and the second electrode is a strip-shaped electrode.

In an embodiment, each of the first electrode and the second electrode is made of ITO.

In an embodiment, the display panel further includes a black matrix provided between any two adjacent second electrodes.

In an embodiment, each of the plurality of pixel units further includes a thin film transistor and a driving electrode, and a drain of the thin film transistor is connected to a first pole of a corresponding inorganic light-emitting diode through the driving electrode.

In an embodiment, the inorganic light-emitting diode includes the first pole, a P-type heavily doped layer, a light-emitting layer, an N-type heavily doped layer, and a second pole which are provided on the first base body sequentially.

In an embodiment, the thin film transistor includes an oxide thin film transistor.

In an embodiment, the first pole is an anode, and the second pole is a cathode.

Some embodiments of the present disclosure provide a display device, which includes the display panel according to embodiments of the present disclosure.

DETAILED DESCRIPTION

For the purpose that one of ordinary skill in the art can understand the technical solutions of the present disclosure better, the present disclosure will be further described in detail below with reference to the accompanying drawings and embodiments.

At present, commonly used flat panel display devices include a liquid crystal display (LCD) device and an organic light-emitting diode (OLED) display device. However, the inventors of the present disclosure have found that an LCD panel is difficult to be configured as a display panel having flexibility and high color gamut and has high power consumption. Further, an OLED display panel is difficult to be configured as a display panel with high resolution and high transmittance and has a limited lifetime for emitting light.

An inorganic light-emitting diode (also referred to as miro-OLED) has advantages such as high transmittance, light weight, low power consumption, high color gamut, and the like, and has been used in the manufacture of an inorganic light-emitting diode display panel. However, a viewing angle of the inorganic light-emitting diode display panel in the prior art is not adjustable. Since users have increasingly high requirements for performances of a display panel, it is desirable to provide an inorganic light-emitting diode display panel with an adjustable viewing angle.

Figure 1:
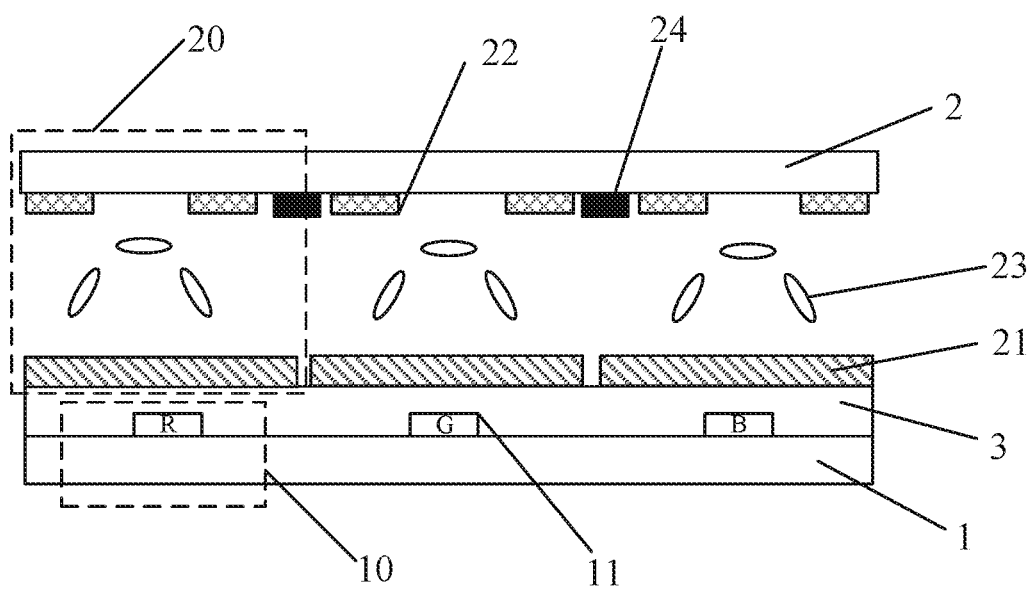
FIG. 1 is a schematic diagram showing a structure of a display panel according to an embodiment of the present disclosure.

As shown in FIG. 1, an embodiment of the present disclosure provides a display panel, which includes a display substrate and a liquid crystal lens provided at a light exiting surface side of the display substrate. The display substrate includes a first base body (e.g., a glass base board) 1 and a plurality of pixel units 10 provided on the first base body 1. Each of the plurality of pixel units 10 includes an inorganic light-emitting diode 11. The liquid crystal lens includes a plurality of lens units 20, the plurality of lens units 20 are arranged to have a one-to-one correspondence to the plurality of pixel units 10, and configured to adjust directions of light emitted from the inorganic light-emitting diodes 11 of the plurality of pixel units 10, respectively.

In the present embodiment, the inorganic light-emitting diodes 11 may be provided in the display substrate by transfer printing. Since each of the inorganic light-emitting diodes 11 has advantages such as small size, high brightness, high contrast, light weight, low power consumption, high color gamut, high efficiency, long lifetime, fast response and the like, the display substrate has advantages such as high resolution, good display effect, and the like. Since the display substrate is a display component of the display panel, the display panel according to the present embodiment also has advantages such as high resolution, good display effect, and the like. Further, since the plurality of lens units 20 for adjusting directions of light emitted from the inorganic light-emitting diodes 11 of the plurality of pixel units 10 are further provided at the light exiting surface side of the display substrate provided by the present embodiment, the display panel can display at different viewing angles.

In an embodiment, the inorganic light-emitting diodes 11 may include an inorganic red light-emitting diode R, an inorganic green light-emitting diode G, and an inorganic blue light-emitting diode B. However, the present disclosure is not limited thereto. For example, the inorganic light-emitting diodes 11 may further include an inorganic light-emitting diode emitting light of another color, which can be selected according to practical applications.

In the display panel according to the present embodiment, a planarization layer 3 may be provided between the display substrate and the liquid crystal lens. Each of the plurality of lens units 20 includes a first electrode 21 provided at a side of the planarization layer 3 distal to the display substrate, a second base body 2 provided opposite to the first electrode 21, a second electrode 22 provided at a side of the second base body 2 proximal to the first electrode 21, and a liquid crystal layer 23 provided between the first electrode 21 and the second electrode 22. In this case, directions of light emitted from the inorganic light-emitting diodes 11 of the display substrate may be adjusted, by adjusting a magnitude of the voltage applied across the first electrode 21 and the second electrode 22 to cause liquid crystal molecules in the liquid crystal layer 23 to rotate towards different directions, thereby enabling the display panel to display at different viewing angles.

In an embodiment, the first electrode 21 of each of the plurality of lens units 20 is a plate-shaped electrode, and the second electrode 22 thereof is a ring-shaped electrode. In this case, In this case, an electric field formed by applying a voltage across the plate-shaped electrode and the ring-shaped electrode can control the liquid crystal molecules in the liquid crystal layer 23 of the lens unit 20 to be arranged to form a hemispherical shape, i.e., the shape of a microlens, as shown in FIG. 1. The shape of the microlens changes with the strength of the electric field formed, such that the light can be emitted from the inorganic light-emitting diodes 11 of the display substrate in various directions.

In an embodiment, the ring-shaped electrode is a rectangle ringlike electrode.

Alternatively, the first electrode 21 of each of the plurality of lens units 20 is a plate-shaped electrode, and the second electrode 22 thereof is a strip-shaped electrode. The first electrode 21 and the second electrode 22 may have various structures as long as they, after a voltage is applied across them, can cause the liquid crystal molecules in the liquid crystal layer 23 be arranged to form the shape of a microlens.

In an embodiment, each of the first electrode 21 and the second electrode 22 may be made of ITO (indium tin oxide). Alternatively, other transparent conductive materials may also be employed.

In an embodiment, a black matrix 24 may be provided between any two adjacent second electrodes 22. The black matrix 24 can prevent an electric field formed by any two adjacent second electrodes 22 in a case where there is a voltage difference therebetween from having an influence on the rotation of the liquid crystal molecules in the liquid crystal layer 23 under the second electrodes 22, thereby avoiding an influence on the directions of light emitted from the inorganic light-emitting diodes 11.

It should be understood that, the first electrodes 21 may be electrically insulated from each other, and the second electrodes 22 may be electrically insulated from each other.

Figure 2:
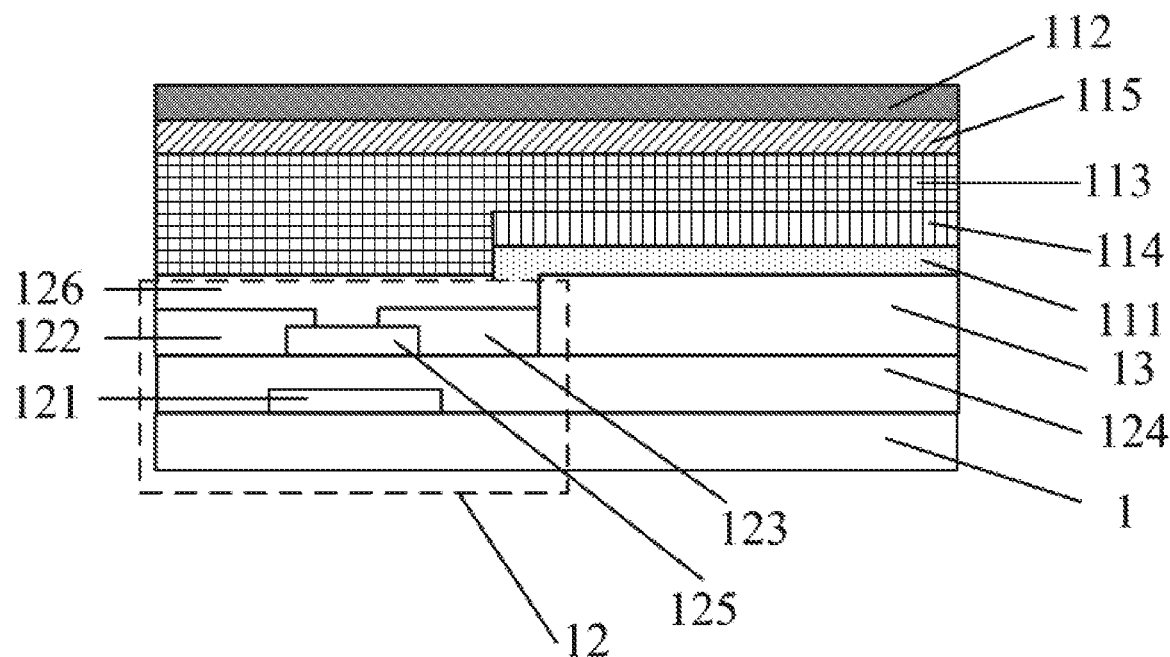
FIG. 2 is a schematic diagram showing a structure of one pixel unit in a display panel according to an embodiment of the present disclosure.

As an example, the display substrate may include a base body (e.g., the first base body 1) and a plurality of gate lines and a plurality of data lines (not shown) provided on the base body. The plurality of gate lines and the plurality of data lines cross each other, and each of regions resulting from the crossing of the plurality of gate lines and the plurality of data lines defines one of the pixel units 10. As shown in FIGS. 1 and 2, in addition to the inorganic light-emitting diode 11, each of the plurality of pixel units 10 further includes a thin film transistor 12 and a driving electrode 13. A drain 123 of the thin film transistor 12 is connected to a first pole 111 of the corresponding inorganic light-emitting diode 11 through the driving electrode 13. A second pole 112 of the inorganic light-emitting diode 11 is connected to one end of an electrode line, and the other end of the electrode line is connected to a reference voltage source. A source 122 of the thin film transistor 12 is connected to one of the data lines, and a gate 121 thereof is connected to one of the gate lines.

Specifically, when a scan signal is inputted through one of the gate lines, the thin film transistor 12 connected to the gate line is turned on. At this time, the data voltage applied on the corresponding data line is outputted to the first pole 111 of the corresponding inorganic light emitting diode 11 through the thin film transistor 12 and the driving electrode 13, correspondingly, a reference voltage (a value of the reference voltage is different from that of the data voltage) is inputted to the second pole 112 of the inorganic light-emitting diode 11 through the electrode line, to drive the inorganic light emitting diode 11 to emit light.

In an embodiment, the thin film transistor 12 may optionally be an oxide thin film transistor, but the present disclosure is not limited thereto. For example, the thin film transistor 12 may be any one of a polysilicon thin film transistor, an amorphous silicon thin film transistor, a monocrystalline silicon thin film transistor, and an organic thin film transistor.

FIG. 2 is a schematic diagram showing a structure of one of the pixel units 10 according to an embodiment of the present disclosure. Referring to FIGS. 1 and 2, the pixel unit 10 includes one thin film transistor 12 and one inorganic light emitting diode 11. The first pole 111 of the inorganic light-emitting diode 11 is generally an anode, and the second pole 112 thereof is generally a cathode. Further, a functional layer is provided between the first pole 111 and the second pole 112, and generally may include a P-type heavily doped layer 114, a light-emitting layer 113, and a N-type heavily doped layer 115 sequentially provided in a direction from the anode to the cathode. Further, the pixel unit 10 may further include the driving electrode 13, and the drain 123 of the thin film transistor 12 is connected to the first pole 111 of the inorganic light-emitting diode 11 through the driving electrode 13.

Further, the thin film transistor 12 may further include a gate insulation layer 124 provided between the gate 121 and the source 122 (or between the gate 121 and drain 123), a channel region 125 provided between the source 122 and the drain 123, and an insulation layer (a passivation layer) 126 provided between an active region (which includes the channel region 125, the source 122 and the drain 123) and the light-emitting layer 113 of the inorganic light-emitting diode 11.

Further, materials of the gate 121, the gate insulation layer 124, and the active region (which includes the channel region 125, the source 122 and the drain 123) of the thin film transistor 12 may be sequentially applied to the first base body 1 by transfer printing, thereby forming the thin film transistor 12.

Another embodiment of the present disclosure provides a display device, which includes the display panel according to the above embodiments of the present disclosure. Thus, the display device has the advantages such as high resolution, flexibility, transparency, high brightness, high contrast, light weight, low power consumption, high color gamut, and the like.

Optionally, the display device may be a liquid crystal display device or an electroluminescent display device. For example, the display device may be any product or component having a display function, such as a liquid crystal display panel, an OLED panel, a mobile phone, a tablet computer, a television, a display, a laptop computer, a digital photo frame, a navigator, and the like.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A display panel, comprising a display substrate and a liquid crystal lens provided at a light exiting surface side of the display substrate, wherein
the display substrate comprises a first base body and a plurality of pixel units provided on the first base body, and each of the plurality of pixel units comprises an inorganic light-emitting diode; and
the liquid crystal lens comprises a second base body provided on a side of the liquid crystal lens opposite to the first base body, and a plurality of lens units provided on the second base body and between the first base body and the second base body, the plurality of lens units are arranged to have a one-to-one correspondence to the plurality of pixel units, and configured to adjust directions of light emitted from the inorganic light-emitting diodes of the plurality of pixel units, respectively;
wherein the first base body and the second base body are two opposite base bodies constituting a liquid crystal cell, and the first base body is on a side of the display substrate opposite the liquid crystal lens.

2. The display panel according to claim 1, further comprising a planarization layer provided between the display substrate and the liquid crystal lens, wherein each of the plurality of lens units comprises a first electrode provided at a side of the planarization layer distal to the display substrate, a second electrode provided at a side of the second base body proximal to the first electrode, and a liquid crystal layer provided between the first electrode and the second electrode.

3. The display panel according to claim 2, wherein the first electrode is a plate-shaped electrode, and the second electrode is a ring-shaped electrode.

4. The display panel according to claim 2, wherein the first electrode is a plate-shaped electrode, and the second electrode is a strip-shaped electrode.

5. The display panel according to claim 2, wherein each of the first electrode and the second electrode is made of ITO.

6. The display panel according to claim 2, further comprising a black matrix provided between any two adjacent second electrodes.

7. The display panel according to claim 1, wherein each of the plurality of pixel units further comprises a thin film transistor and a driving electrode, and a drain of the thin film transistor is connected to a first pole of a corresponding inorganic light-emitting diode through the driving electrode.

8. The display panel according to claim 7, wherein the inorganic light-emitting diode comprises the first pole, a P-type heavily doped layer, a light-emitting layer, an N-type heavily doped layer, and a second pole which are provided on the first base body sequentially.

9. The display panel according to claim 7, wherein the thin film transistor comprises an oxide thin film transistor.

10. The display panel according to claim 8, wherein the first pole is an anode, and the second pole is a cathode.

11. A display device, comprising the display panel according to claim 1.

12. The display panel according to claim 2, wherein each of the plurality of pixel units further comprises a thin film transistor and a driving electrode, and a drain of the thin film transistor is connected to a first pole of a corresponding inorganic light-emitting diode through the driving electrode.

13. The display panel according to claim 3, wherein each of the plurality of pixel units further comprises a thin film transistor and a driving electrode, and a drain of the thin film transistor is connected to a first pole of a corresponding inorganic light-emitting diode through the driving electrode.

14. The display panel according to claim 4, wherein each of the plurality of pixel units further comprises a thin film transistor and a driving electrode, and a drain of the thin film transistor is connected to a first pole of a corresponding inorganic light-emitting diode through the driving electrode.

15. The display panel according to claim 5, wherein each of the plurality of pixel units further comprises a thin film transistor and a driving electrode, and a drain of the thin film transistor is connected to a first pole of a corresponding inorganic light-emitting diode through the driving electrode.

16. The display panel according to claim 6, wherein each of the plurality of pixel units further comprises a thin film transistor and a driving electrode, and a drain of the thin film transistor is connected to a first pole of a corresponding inorganic light-emitting diode through the driving electrode.

* * * * *